United States Patent [19]

Ohno et al.

[11] Patent Number: 4,636,062
[45] Date of Patent: Jan. 13, 1987

[54] IMAGE FORMING APPARATUS
[75] Inventors: Akio Ohno, Kawaguchi; Akiyoshi Torigai, Machida, both of Japan
[73] Assignee: Canon Kabushiki Kaisha, Tokyo, Japan
[21] Appl. No.: 602,012
[22] Filed: Apr. 19, 1984
[30] Foreign Application Priority Data
Apr. 26, 1983 [JP] Japan .................................. 58-72122
[51] Int. Cl.⁴ ....................... G03B 27/52; G03B 27/70
[52] U.S. Cl. .................................................... 355/43
[58] Field of Search ....................... 355/43, 44, 45, 46, 355/72, 3 R, 1; 354/161, 200, 201

[56] References Cited
U.S. PATENT DOCUMENTS
2,718,812 9/1955 Nitz ........................................ 355/44
4,027,962 6/1977 Mailloux ............................ 355/43 X
4,120,580 10/1978 Mailloux et al. ................ 355/3 R X Primary Examiner—L. T. Hix
Assistant Examiner—Brian W. Brown
Attorney, Agent, or Firm—Fitzpatrick, Cella, Harper & Scinto

[57] ABSTRACT

Disclosed is an image forming apparatus for forming copy images of a reflection original and a transmitting original. The apparatus has first projection means for projecting the image of the reflection original, second projection means for projecting the image of the transmitting original, and an image receiving member for receiving the light from the second projection means. The image receiving member is mounted on an original supporting table for supporting the reflection original thereon, and comprises a mirror for reflection the light from the second projection means toward the original supporting table, a condenser lens for condensing the light from the mirror, and a screen member removably insertable in the reflecting optical path of the mirror.

12 Claims, 10 Drawing Figures

IMAGE FORMING APPARATUS

BACKGROUND OF THE INVENTION

1. Field of the Invention

This invention relates to an image forming apparatus for forming copy images of reflection originals such as documents or books which is endowed with the function of forming a copy image of a transmitting original such as a slide film or the like.

2. Description of the Prior Art

Figure 1:
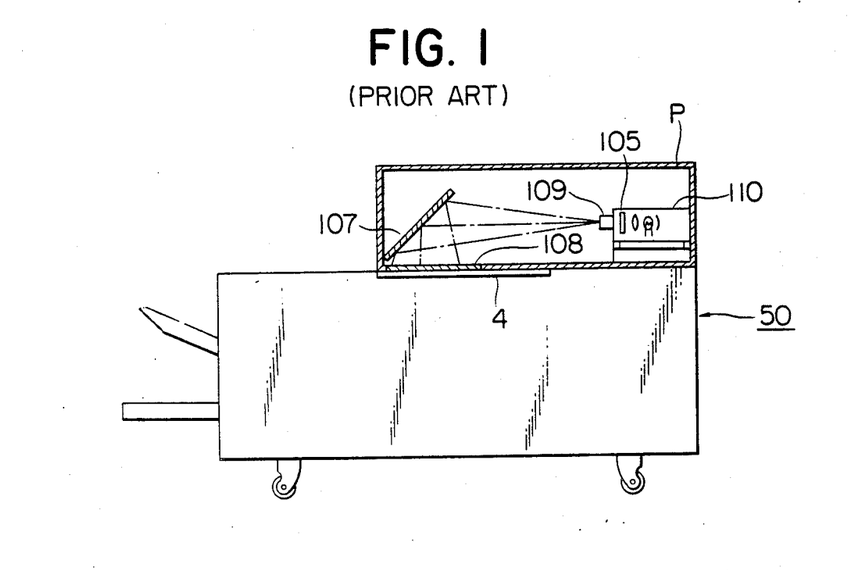
FIGS. 1 and 2 illustrate a copying apparatus according to the prior art.
Figure 2:
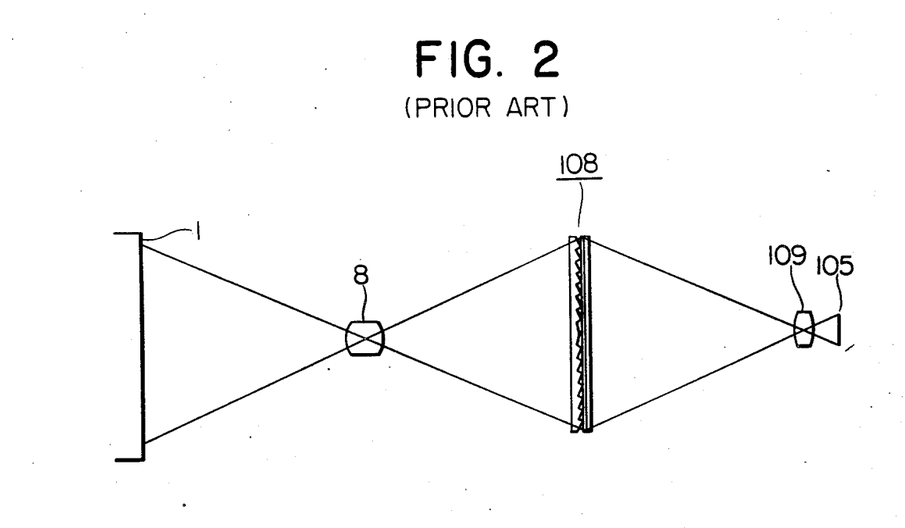

In a copying apparatus capable of copying not only ordinary reflection originals but also transmitted enlarged projected images of a slide film (hereinafter referred to as the combination copying apparatus), optical alignment for obtaining copies of the transmitted enlarged projected images of the slide film has been very difficult. This will hereinafter be described in detail by reference to FIGS. 1 and 2 of the accompanying drawings. In FIG. 1, reference numeral 50 designates a copying apparatus body, reference numeral 4 denotes an original supporting glass plate provided on the copying apparatus body 50, and P designates a slide projection device. The projection device P has a Fresnel lens 108, a reflecting mirror 107 for changing the optical path, a projection lens 109 for enlargedly projecting a slide film, and an illuminating portion 110 for holding the slide film 105 and illuminating it. The device P is removably mounted on the apparatus body 50. A photosensitive drum 1 and an optical system including a lens 8 are disposed within the copying apparatus body 50, as shown in FIG. 2, but these are not shown in FIG. 1. In FIG. 2, reference numeral 105 designates the slide film, and reference numeral 109 denotes the projection lens of the slide projection device P. In such a conventional combination copying apparatus, during the copying of an ordinary reflection type original, the bulky and weighty slide projection device including the reflecting mirror 107, the Fresnel lens 108 and the illuminating device 110 must be removed and moved from the original supporting glass plate 4 and thus, the change-over operation thereof has been cumbersome. Also, before the projected image of the slide is copied, the slide film 105 which is an original must be loaded into the projection device P and the point of focus must be adjusted on the upper surface of the original supporting glass plate 4 by the projection lens 109.

This has led to the necessity of the procedures of removing the Fresnel lens 108 on the original supporting glass plate 4, placing a sheet of white paper on the original supporting glass plate 4, projecting an image onto the white paper and adjusting the point of focus, thereafter removing the white paper from the original supporting glass plate 4 and adjusting the optic axis of the Fresnel lens 108. Alternatively, it is also conceivable to observe the point of focus by a projected image falling on the frame-like white paper for setting the copying area existing between the Fresnel lens 108 and the original supporting glass plate 4, but it is dangerous to adjust the point of focus in the marginal portion of the slide film 105 which lies outside the copying area, because it is very rare that the focused surface of the original lies around the slide film 105.

SUMMARY OF THE INVENTION

It is an object of the present invention to eliminate the above-noted inconveniences.

It is another object of the present invention to provide an image forming apparatus which can be simply changed over between a mode for copying reflection originals and a mode for copying transmitting originals.

It is still another object of the present invention to provide an image forming apparatus in which the copying mode can be changed over simply by moving a relatively light-weight optical member having a mirror, a Fresnel lens and a screen member without the necessity of moving a bulky and heavy projection device.

It is yet another object of the present invention to provide an image forming apparatus which enables a transmitting original to be confirmed and permits the adjustment of the point of focus and of the optic axis to be accomplished simply and accurately.

An embodiment of the image forming apparatus according to the present invention will hereinafter be described in detail by reference to the accompanying drawings.

DESCRIPTION OF THE PREFERRED EMBODIMENT

Figure 3:
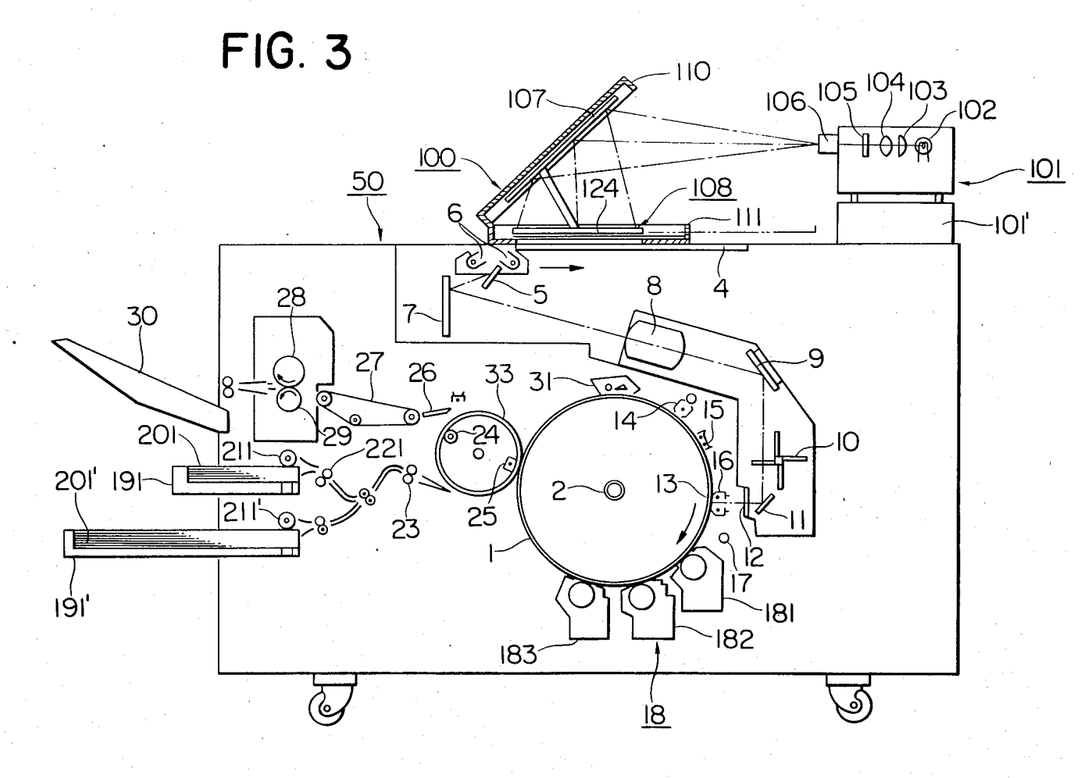
FIG. 3 is a schematic view, partly in cross-section of a copying apparatus according to the present invention.

Referring to FIG. 3, reference numeral 4 designates an original supporting glass plate for supporting thereon a reflection original, reference numeral 6 denotes an illuminating lamp, reference numeral 5 designates a first scanning mirror, and reference numeral 7 denotes a second scanning mirror. These lamp and mirrors are moved forward in the direction of the arrow and scan the image of the original. Reference numeral 8 designates an imaging lens, reference numeral 9 denotes a third mirror, reference numeral 10 designates a color resolving filter, reference numeral 11 denotes a fourth mirror, and reference numeral 12 designates a dustproof sealing glass. The mirrors 5, 7, 9 and 11 and the imaging lens 8 together constitute a first projection device. Reference numeral 1 denotes an electrophotographic photosensitive drum having an insulating layer on the surface thereof. The photosensitive drum 1 is rotatably supported on a shaft 2 and starts to rotate in the direction of the arrow by a copy command. Disposed around the drum 1 are a discharger 14, a primary charger 15, a discharger 16, a whole surface exposure lamp 17, a developing device 18, a transfer charger 25 and a cleaning device 31 in the named order. The developing device 18 comprises a yellow color developing device 181, a magenta color developing device 182 and a cyan color developing device 183. Reference numeral 13 designates an exposed portion in which the image of the original is formed on the drum 1 by the above-described optical system. Reference numeral 33 denotes a transfer drum having a gripper 24, reference numeral 26 designates a separating pawl, reference numeral 27 denotes a conveyor belt, reference numerals 28 and 29 designate fixing rollers, and reference numeral 30 denotes a paper discharge tray. Reference numerals 191 and 191' designate cassettes, reference numerals 201 and 201' denote sheets of transfer paper, reference numerals 211 and 211' designate paper feeding rollers, reference numeral 221 denotes first register rollers, and reference numeral 23 designates second register rollers.

Reference numeral 100 designates a projected image receiving device which, as will later be described, comprises chiefly an upper body portion 110 provided with a reflecting mirror 107, and a lower body portion 111 provided with a Fresnel lens 108 as a condenser lens and a screen member 124 as an image receiving member. Reference numeral 101 denotes a second projection device for projecting the image of a slide film. The second projection device 101 has a lamp 102 provided with a reflecting mirror, condenser lenses 103 and 104 and a projection lens 106. When the projected image receiving device 100 is placed at a predetermined position on the original supporting glass plate 4, the screen member 124 is placed at a position between the Fresnel lens 108 and the original supporting glass plate 4 which is within the depth of focus of the projection lens 106 of the second projection device 101 and within the depth of field of the imaging lens 8 in the copying apparatus body 50. The screen member 124 comprises a reflection type screen for observing a reflected image and has a light-diffusive reflecting surface. The screen member may be a light-diffusive synthetic resin layer or a light-diffusing layer provided on white paper or an aluminum back-up member, the light diffusing layer consisting of silica powder dispersed in a polymer. The projected image receiving device 100 is removably mountable on the copying apparatus body 50 and moreover, the upper body portion 110 and the lower body portion 111 are openable-closable.

Figure 4:
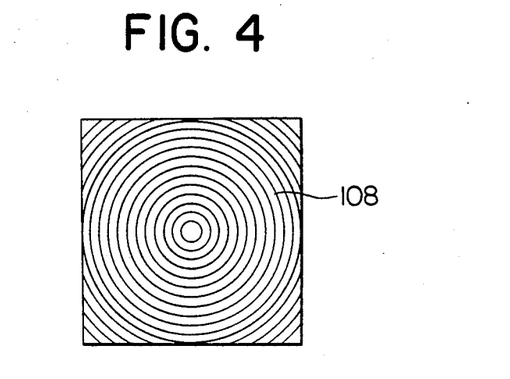
FIGS. 4 and 5 are schematic views of a condenser lens.
Figure 5:
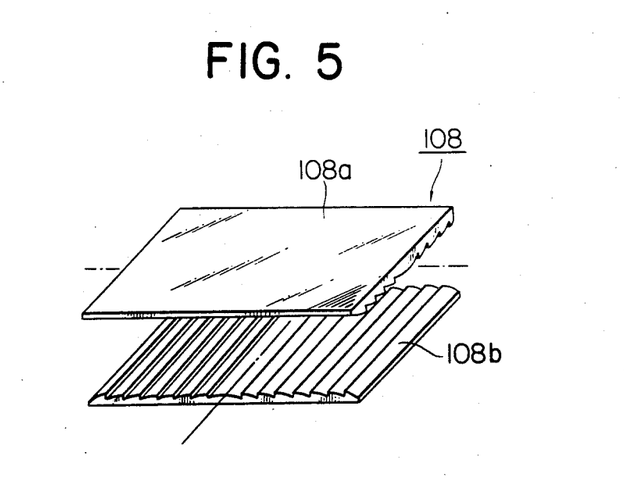

The image of the slide film 105 (a positive image) is projected onto the screen member 124 inserted in the reflecting optical path of the mirror 107 or onto the original supporting glass plate 4 by way of the lens 106, the mirror 107 and the Fresnel lens 108. The Fresnel lens 108 may be of the concentric circle type as shown in FIG. 4 or two cylindrical lenses replaced with each other with their bus lines being made orthogonal to each other as shown in FIG. 5. In the case of the present embodiment, the Fresnel lens shown in FIG. 5 is employed. The focal plane of the imaging lens 8 lines on the upper surface of the original supporting glass plate 4 and, where the projected image receiving device 100 is placed on the apparatus body 50 as shown in FIG. 3, the Fresnel lens 108 is within the depth of field of the imaging lens 8. Therefore, the screen member 124 is of course within the depth of field of the imaging lens 8.

Figure 6:
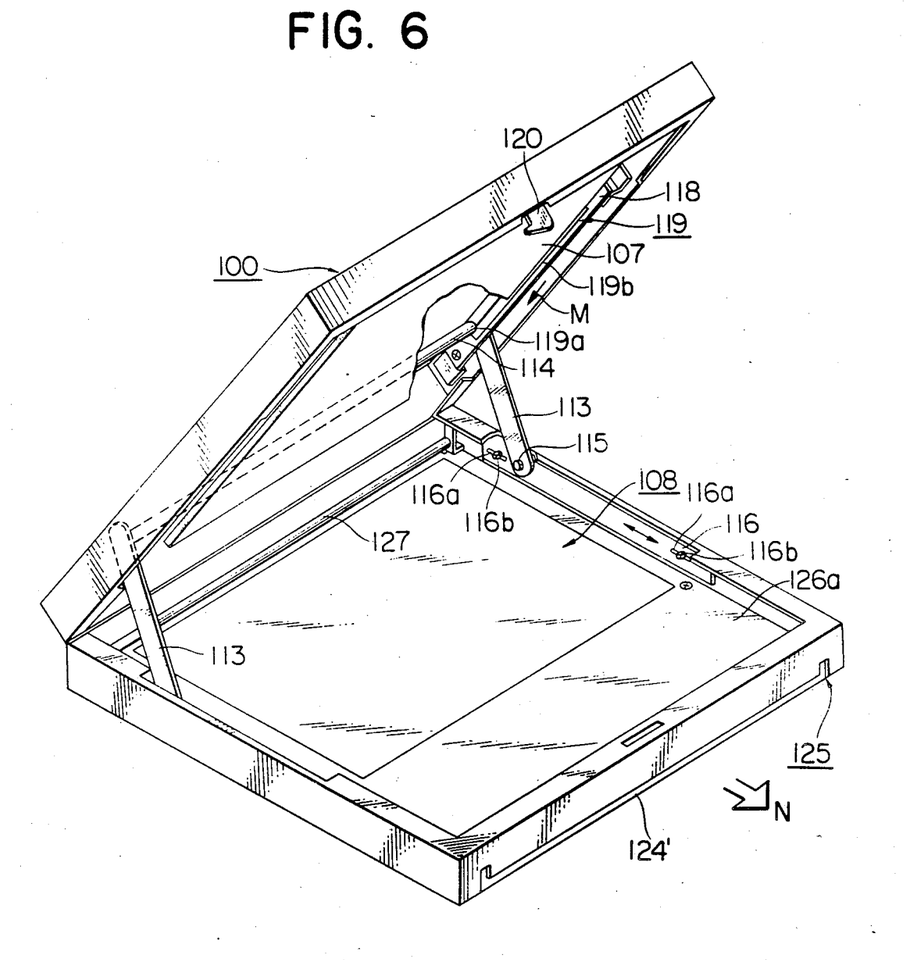
FIG. 6 is a perspective view of the projected image receiving device of the copying apparatus according to the present invention.
Figure 7:
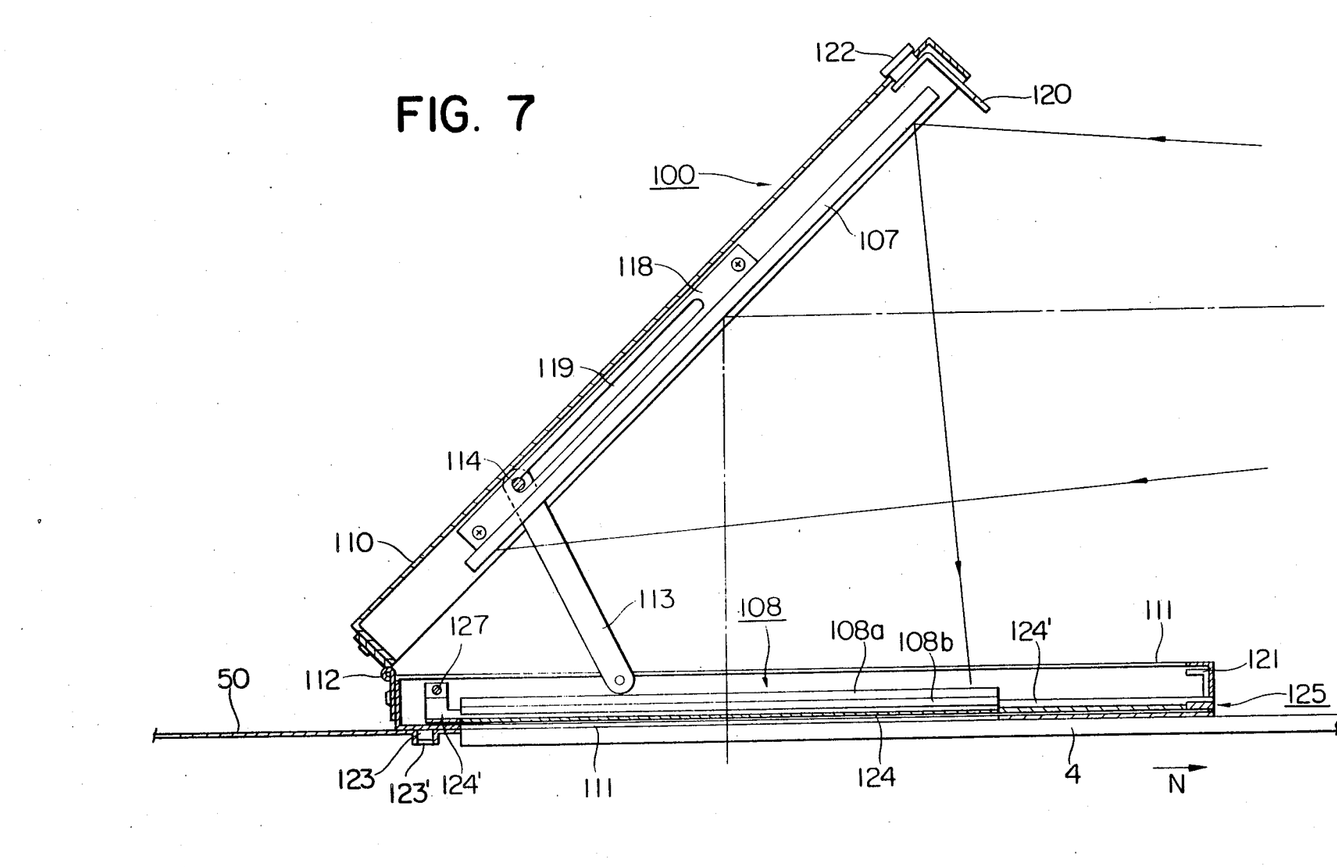
FIG. 7 is a cross-sectional view of the FIG. 6 device with some parts thereof omitted.
Figure 8:
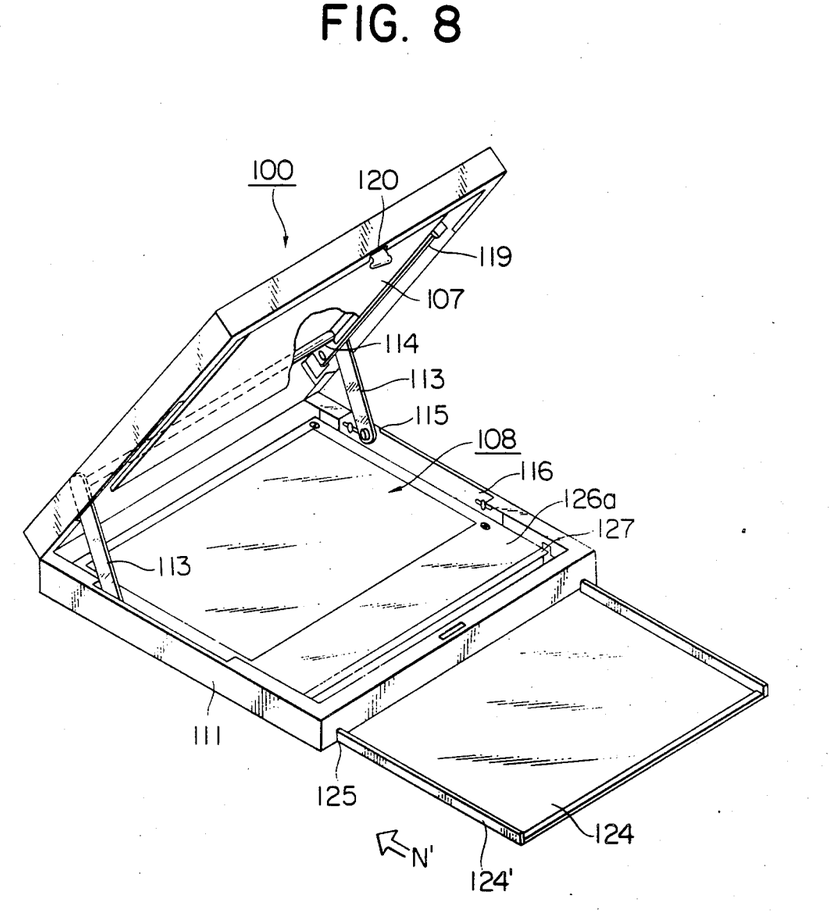
FIG. 8 is a perspective view of the projected image receiving device of the copying apparatus according to the present invention.

FIG. 6 is a partly broken-away perspective view of the projected image receiving device including the reflecting mirror and the Fresnel lens shown in FIG. 3, and FIG. 7 is a cross-sectional view thereof with a part thereof omitted. FIG. 8 is a partly broken-away perspective view of the projected image receiving device when the screen member has been drawn out.

In FIGS. 6 to 8, the projected image receiving device 100 according to the present invention is a foldable type device comprising chiefly the upper body portion 110 supporting the reflecting mirror 107, and the lower body portion 111 having an opening for supporting the Fresnel lens 108 and directing the projected image onto the Fresnel surface and an opening for directing the projected image transmitted through the Fresnel lens 108 to the copying apparatus body 50 through the original supporting glass plate 4 and moreover comprising a picture-frame-like frame member holding the screen member 124 between the Fresnel lens 108 and the opening, the two body portions being connected at one end thereof by a hinge 112, stays 113 being openably-closably connected to the surfaces on the opposite sides of the mounted surface of the hinge 112. The two stays 113 are for holding substantially at 45° the reflecting mirror 107 mounted on the upper body portion 110 and the Fresnel lens 108 mounted on the lower body portion 111. One end of each of the stays 113 is pivotally connected to a pin 115 provided on each side of the lower body portion 111 and fixed through an angle regulating plate 116, and at the other ends of the stays, a connecting bar 114 extends between the two stays and through the guide rails 119 of two stay guide plates 118 provided on the opposite sides of the upper body portion 110.

Reference numeral 120 designates a locking pawl provided with a knob 122. By moving this knob 122 in a direction perpendicular to the plane of the drawing sheet of FIG. 7, the locking pawl 120 may be engaged with an L-shaped member 121 provided in the lower body portion 111 to thereby lock the upper body portion 110 and the lower body portion 111.

The angle regulating plate 116 is formed with the slots 116a, through which screws 116b are threadably fitted in screw holes provided in the lower body portion 111. If these screws 116b are loosened from the screw holes, the angle regulating plate 116 is movable in the direction of double-headed arrow indicated in FIG. 6 and can accomplish angle regulating of the reflecting mirror 107 through the stays 113. By fastening the screws 116b after the angle has been regulated, the angle regulating plate 116 may be fixed.

Designated by 123 are positioning pins for the projected image receiving device 100 and the copying apparatus body 50. The pins are provided in the lower body portion 111, but they are not shown in the other Figures than FIG. 7. The Fresnel lens 108 of the device 100 comprises two cylindrical Fresnel lenses 108a and 108b whose bus lines are orthogonal to each other as shown in FIG. 5.

The screen member 124 for temporally reflecting the projected image is provided between the Fresnel lens 108 and the original supporting glass plate 4. In the present embodiment, the screen member 124 is a thin sheet member whose front and back surfaces are painted in white.

This screen member 124 is supported by a substantially U-shaped screen member supporting frame 124', and by sliding a bar 127 connecting the bent portions of the screen member supporting frame 124' in the direction of arrow N, the screen member 124 may pass through a slit 125 provided in the lower body portion 111, whereby it may be removed from the projected image receiving area under the Fresnel lens 108, as shown in FIG. 8.

Figure 9:
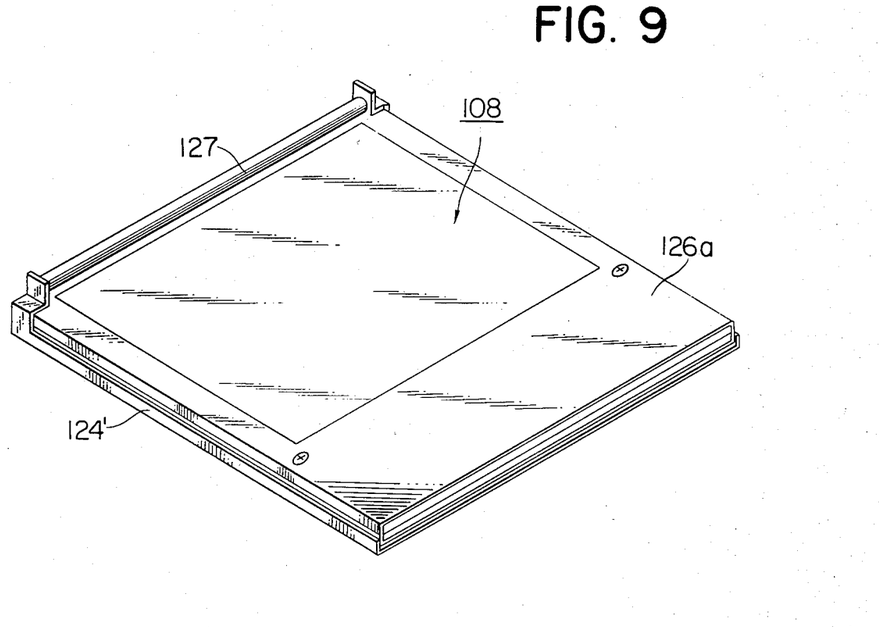
FIG. 9 is a perspective view of a portion of the FIG. 6 device.
Figure 10:
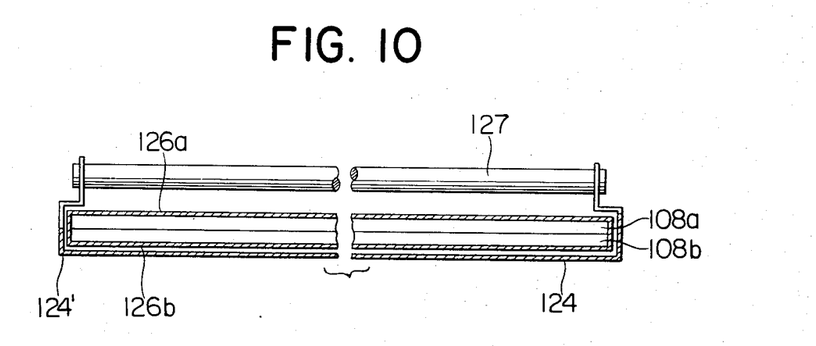
FIG. 10 is a cross-sectional view of the portion shown in FIG. 9.

FIG. 9 is a perspective view showing the relation between the screen member and the Fresnel lens, and FIG. 10 is a cross-sectional view thereof. In FIGS. 9 and 10, reference characters 126a and 126b designate Fresnel support plates for making the two Fresnel lenses 108a and 108b integral with each other, and the screen member 124 moves along the opposite side surfaces of the Fresnel support plates 126 while being guided and held by the screen member supporting frame 124'. Although the system of mounting the Fresnel lens supporting plates 126a and 126b on the lower body portion 111 is not described, these plates may extend to the striking block of the lower body portion, for example, in the direction of arrow N in FIG. 6, or a plurality of projections suitably provided with unloaded holes at the end portions thereof may be provided and the plates may be supported with the projections being brought into coincidence with screw holes provided in the opposite side surfaces of the lower body portion and being set by screws.

In the foregoing description, the system of supporting the reflecting mirror 107 has neither been described, whereas the reflecting mirror 107 may be supported on the upper body portion 110 by a conventional system, for example, by adhesively fixing pillar-like support struts to the four corners of the reflecting mirror 107 and further adhesively fixing these support struts to the upper body portion 110.

Operation of an embodiment of the copying apparatus according to the present invention will now be described by reference to FIGS. 3 and 6 to 8.

First, in a case where the transmitted enlarged projected image is to be copied, that is, in a case where the copy image of the slide film is to be formed, if, although not shown, the upper body portion 110 and the lower body portion 111 of the projected image receiving device 100 are closed and locked by the locking pawl 120, the projected image receiving device 100 is placed onto the copying apparatus body 50 and the positioning pins 123 are inserted into the mating holes 123' of the copying apparatus body 50, thereby effecting positioning. At this time, the optic axis of the Fresnel lens 108 is substantially coincident with the optic axis of the lens 8 through the intermediary of the first and second scanning mirrors 5 and 7. Then, although not shown, the knob 122 of the closed projected image receiving device 100 is manually moved to release the engagement between the locking pawl 120 and the L-shaped member 121.

In this manner, the locking mechanism for suppressing the rotation of the upper body portion 110 relative to the lower body portion 111 is released as described above and the upper body portion 110 is rotated about the hinge 112, whereupon the connecting bar 114 is moved along the slide portions 119b of the guide rails 119 to a position indicated in FIG. 6 in the direction of arrow M and with this movement, the stays 113 start to rotate about the pins 115 and, when they reach a predetermined angle, the rotation thereof is restrained and the connecting bar 114 fits in the mating portions 119a of the guide rails 119 and thus, the open position of FIGS. 3, 6 and 7 is reached. At this time, the angle formed between the reflecting mirror 107 and the Fresnel lens 108 is held at 45°. This angle is varied by the pins 115 which are the axis of rotation of the stays 113, and the angle regulating plate 116 to which the pins 115 are fixed can be adjustably fixed to the lower body portion 111 by screws 116b in the slots 116a of the angle regulating plate and thus, the upper body portion can be set always substantially at an angle of 45° even if there is irregularity between the parts.

As described above, once the angle between the reflecting mirror 107 and the Fresnel lens 108 is regulated by regulating the angle regulating plate 116, the relative position of the reflecting mirror 107 and the Fresnel lens 108 does not vary even for repeated opening-closing of the projected image receiving device 100 thereafter and therefore, adjustment such as the alignment of the optic axis thereafter becomes unnecessary. At this time, the Fresnel lens 108 is positioned within the depth of field of the imaging lens 8 when through the first scanning mirror 5 and the second scanning mirror 7 in the copying apparatus body 50. Also, since the focus position of the imaging lens 8 lies on the upper surface of the original supporting glass plate 4, the screen member 124 lying between this surface and the Fresnel lens 108 is naturally within the depth of field of the imaging lens 8. Thereafter, the enlarged image of the slide film 105 is projected by the second projection device 101 installed on the copying apparatus body 50. This enlarged projected image of the slide film 105 may be downwardly reflected by the reflecting mirror 107 and imaged on the upper surface of the screen member 124 through the Fresnel lens 108. However, when the position of the screen member 124 when through the reflecting mirror 107 is not within the depth of focus of the projection lens 106 of the second projection device 101, the image of the upper surface of the screen member 124 is blurred. To correct this blur, the position of the projection lens 106 is adjusted by conventional means and a sharp image of the slide film 105 is formed on the upper surface of the screen member 124. Thereby, the screen member 124 is positioned within the depth of focus of the projection lens 106 of the second projection device 101 and within the depth of field of the imaging lens 8. Desirably, at this time, of the depth of focus of the projection lens 106, the position nearer to the projection lens 106 should lie on the upper surface of the screen member 124. This is because there is a positional deviation between the upper surface of the screen member 124 and the upper surface of the original supporting glass plate 4 and this deviation is very slight and offers no problem in most cases, but the upper surface of the original supporting glass plate 4 must deviate from the depth of focus of the projection lens 106 as little as possible when the screen member 124 is removed. Also, in FIG. 7, if the opening of the lower body portion 111 is provided throughout the direction of arrow N and the screen member 124 comes close to the original supporting glass plate 4, said deviation is only the thickness of the screen member 124 and the above-mentioned fear is eliminated.

Next, when, in the state of the projected image receiving device 100 shown in FIGS. 3, 6 and 7, the bar 127 provided on the screen member supporting frame 124' supporting the screen member 124 is manually pulled in the direction of arrow N, the screen member 124 passes through the slit 125 and deviates the projected image receiving area under the H; Fresnel lens 108, as shown in FIG. 8. Also, when the screen member 124 is deviated from the projected image receiving area under the Fresnel lens 108 as indicated by dots-and-dash line in FIG. 3, the enlargled projected image of the slide film 105 by the second projection device 101 assumes a positional relation as shown in FIG. 2 during scanning and passes through the original supporting glass plate 4 of FIG. 3 as will later be described and is imaged on the exposure portion 13 through the first projection device comprising the first scanning mirror 5, the second scanning mirror 7, the imaging lens 8, etc. The Fresnel lens 108 is for causing the divergent light beam passed through the projection lens 106 to be condensed toward the imaging lens 8 as shown in FIG. 2.

Then, the drum 1 starts to rotate about the shaft 2 in the direction of the arrow in FIG. 3 by a copy command. When the drum 1 rotates to a predetermined position, the enlarged projected image of the slide film 105 formed on the original supporting glass plate is illuminated by the illuminating lamp 6 made integral with the first scanning mirror 5 and the transmitted light of the enlarged projected image whose contrast has been softened is scanned by the first scanning mirror 5 and the second scanning mirror 7. The illuminating lamp 6 may be turned off when the projected image passed through the Fresnel lens 108 is scanned by the first projection device.

The first scanning mirror 5 and the second scanning mirror 7 are moved at a speed ratio of 1:½, whereby scanning of the transmitted enlarged projected image is effected while the length of the optical path from the surface of the original supporting glass plate 4 to the imaging lens 8 is always kept constant. The said transmitted light image passes through the imaging lens 8 and via the third mirror 9, whereafter it is color-resolved by the color resolving filter 10 and further passes via the fourth mirror 11 and through the dust-proof sealing glass 12 and is imaged on the drum 1 in the exposure station 13.

The drum 1 is electrically discharged by the discharger 14 and then charged (for example, to the positive polarity) by the primary charger 15, whereafter an image formed on the drum in the exposure station by the slide projection device 101 and illuminated by the illuminating lamp 6 is slit-exposed. Simultaneously therewith, AC discharging or discharging of the drum to the polarity (for example, the negative polarity) opposite to the primary charge is effected by the discharger 16, whereafter an electrostatic latent image of high contrast is formed on the drum 1 by the whole surface exposure provided by the whole surface exposure lamp 17.

The electrostatic latent image on the photosensitive drum 1 is then developed into a toner image by the developing device 18. The developing device 18 is comprised of three developing devics, i.e., a yellow developing device 181, a magenta developing device 182 and a cyan developing device 183, and a developing device designated correspondingly to the color resolving filter used for exposure operates and a toner image of necessary color is obtained.

The transfer paper 201 in the cassette 191 is fed into the apparatus by the paper feeding rollers 211 and rough timing of the paper is taken by the first register rollers 221, and then exact timing of the paper is taken by the second register rollers 23, whereupon the leading end edge of the paper is gripped by the gripper 24 of the transfer drum 33. With the rotation of the transfer drum 33, the transfer paper is conveyed while winding around the drum 33 and the toner image on the photosensitive drum 1 is transferred to the transfer paper 201 as it passes between the transfer charger 25 and the photosensitive drum 1. The transfer drum 33 makes a required number of rotations while gripping the leading end edge of the transfer paper 201 by the gripper 24 and thus, images of a required number of colors are transferred to the transfer paper.

The copying apparatus shown is provided with two cassettes containing therein sheets of transfer paper of different sizes, respectively, so that those sheets of paper may be fed in a change-over fashion.

After completion of the image transfer, the transfer paper is liberated from the gripper 24 and is guided to the conveyor belt 27 by the separating pawl 26, and is further directed to a pair of fixing rollers 28 and 29, where the transferred image on the transfer paper is fixed by pressure or heating, whereafter the transfer paper is discharged onto the tray 30. On the other hand, the photosensitive drum 1, after the image transfer, has its surface cleaned by the cleaning device 31 comprising an elastic blade and may proceed to another cycle.

Also, if design is made such that the screen member 124 covers the entire surface of the original supporting glass plate 4 as indicated by dots-and-dash line in FIG. 3 when the screen member 124 has been drawn out, the exposure light of the illuminating lamp 6 will not leak outwardly of the copying apparatus body 50 from the original supporting glass plate 4 during the scanning of the enlarged projected image of the slide film 105 by the optical system and thus, the operator will be protected from the sense of displeasure during copying. By painting in white the back side (the side adjacent to the original supporting glass plate) of the screen member 124 and the side of the lower body portion 111 which is adjacent to the original supporting glass plate, the photosensitive drum 1 can be prevented from being exposed to light during scanning the permit unnecessary toner to adhere to the photosensitive drum. Moreover, by this, any solid black portion of the copy can be eliminated and toner is not used more than required, and this leads to a reduced expense.

Where an ordinary reflection type original is to be copied from the above-described condition, the bar 127 is first manually pulled in the direction of arrow N' to contain the screen member 124 of the projected image receiving device 100 which is in the position of FIG. 8 and the screen member 124 is received into the body of the device 100 as shown in FIG. 6. Then, from the condition shown in FIG. 6, the connecting bar 114 of the stays 113 fitted to the mating portions 119a of the guide rails 119 is removed and as the upper body portion 110 is closed, the locking pawl 120 provided in the upper body portion 110 and the L-shaped member 121 of the lower body portion 111 are brought into engagement with each other by adjusting the knob 122, whereby the upper body portion 110 and the lower body portion 111 are locked. The projected image receiving device 100 in this position may be removed from the copying apparatus body 50 and suitably preserved. The second projection device 101 need not be removed from the body 50. At this time, the screen member 124 can serve as a protective cover for the Fresnel lens 108 and can preferably prevent the Fresnel lens 108 and the reflecting mirror 107 from being stained by dust.

Subsequently, an ordinary reflection original is placed onto the original supporting glass plate 4. The photosensitive drum 1 is rotated about the shaft 2 in the direction of arrow by a copy command. At a certain point of time, the first scanning mirror 5, the second scanning mirror 7 and the illuminating lamp 6 are moved in the direction of arrow and scan the ordinary original. The reflected image from this original is slit-exposed on the exposure station 13 through the imaging lens 8, etc. The copying process thereafter is entirely the same as the process of copying the transmitted enlarged projected image, as described above, and therefore need not again be described.

While, in the above-described embodiment, the copying apparatus body has been shown as a color copying apparatus, it may of course be a monochromatic copying apparatus.

Also, instead of the angle regulating plate 16 and the stay guide plate 118 of the projected image receiving device 100 shown in FIG. 6, it is of course possible to utilize a slide device of linear bearing utilizing a ball bearing having a locking mechanism.

In the above-described embodiment, a film having positive images is used, but a film having negative images may also be used. Where a negative film is used, design may be made such that the charging polarity of the photosensitive medium is changed to positive or negative or toners of different polarities are used as the toners of the developing devices.

Also, an image sensor comprising a photoelectric conversion element array may be used instead of the photosensitive drum and this image sensor may be disposed in the exposure station to convert an image into an electrical signal, and a copy image may be formed by a laser beam printer in accordance with the electrical signal.

As described above, by the screen member being provided in the projected image receiving device, the enlarged projected image of the slide film can be confirmed within the depth of focus of the slide projection lens and within the depth of field of the imaging lens of the copying apparatus body, and precise focus adjustment can be accomplished simply. Also, the screen member can be removed from the projected image area by a simple operation without resetting of the optical positional relation.

On the other hand, if design is made such that the screen member as the image receiving member, when drawn out, covers the entire surface of the original supporting glass plate, the exposure light during the scanning of the original will not leak outwardly of the copying apparatus body from the original supporting glass plate and the operator will be protected from the sense of displeasure during copying operation. By painting the back side (the side adjacent to the original supporting glass plate) of the screen member in white, unnecessary toner can be prevented from adhering to the photosensitive medium.

Also, the screen member can serve as a protective cover for the Fresnel lens when the projected image receiving device has been removed from the copying apparatus.

What we claim is:

1. An image forming apparatus for forming copy images of a reflection original and a transparent original, comprising:
    a transparent table for supporting a reflection original thereon;
    support means removably mounted on said table and having an opening facing said table;
    a condenser lens provided on said support means in facing relation with said opening to condense and guide light from a tansparent original through said opening to said table;
    a reflection-type screen disposed on said support means and movable between a first position where said screen interrupts the light from said condenser lens and a second position where said screen does not interrupt the light from said condenser lens;
    first optical means for projecting an image of the transparent original to said condenser lens on said support means mounted on said table; and
    second optical means for projecting when the reflection original is on said table, an image of the reflection original to a photosensitive member and, when said support means is mounted on said table, the image of the transparent original projected to said condenser lens on said support means.

2. An image forming apparatus according to claim 1, wherein said screen, when said support means is mounted on said table, is positioned within the depth of focus of said first optical means and in a plane within the depth of field of said second optical means.

3. An image forming apparatus according to claim 1, further comprising a mirror disposed on said support means for reflecting light from the transparent original toward said condenser lens.

4. An image forming apparatus according to claim 3, wherein said support means has a first support member for supporting said condenser lens and said screen, and a second support member mounted on said first support member to support said mirror, said second support member being movable between a first position where said mirror reflects light from the transparent original to said condenser lens and a second position where said mirror does not reflect light from the transparent original to said condenser lens.

5. An image forming apparatus according to claim 1, further comprising means for positioning said support means at a predetermined position on said table.

6. An image forming apparatus according to claim 1, wherein said screen has light-reflecting surfaces formed on opposite sides thereof.

7. An image forming apparatus according to claim 6, wherein said support means is mounted on only one portion of a copying area of said table, and wherein said screen faces another portion of the copying area of said table when it is at the second position.

8. An image forming apparatus according to claim 7, wherein a surface of said support means facing said table is white.

9. An image forming apparatus according to claim 1, further comprising a lamp for selectively illuminating the reflection original supported on said table and said table when the image of the transparent original is projected onto the photosensitive member.

10. An image forming apparatus according to claim 1, wherein said condenser lens is a Fresnel lens.

11. An image forming apparatus for forming copy images of a reflection original and a transparent original, comprising:
    a transparent table for supporting a reflection original thereon;
    a first support member removably mounted on said table and having an opening facing said table;
    a condenser lens provided on said first support member in facing relation with said opening to condense and guide light from the transparent original through said opening to said table;
    a reflection-type screen disposed on said first support member and movable between a first position where said screen interrupts the light from said condenser lens and a second position where said screen does not interrupt the light from said condenser lens;

a second support member mounted on said first support member for movement between first and second positions;

a mirror located on said second support member for reflecting light from the transparent original toward said condenser lens when said second support member is in the first position, and for preventing light from the transparent original from reaching said condenser lens when said second support member is in the second position;

first optical means for projecting an image of the transparent original onto said mirror when said second support member is in the first position;

second optical means for projecting, when the reflection original is on said table, an image of the reflection original to a photosensitive member and, when said support means is mounted on said table, the image of the transparent original projected to said condenser lens on said support means.

12. In an image reproducing apparatus for projecting onto an image reproducing station an image of a reflection original held on a transparent original holding table, a combination comprising:

a support member removably mounted on said original holding table and having an opening facing said table;

a Fresnel lens located on said support member in facing relation with said opening to guide the light from a film through said opening to said original holding table;

optical means for projecting a film image to said Fresnel lens when said support member is mounted on said table; and a reflection screen mounted on said support member and movable in a direction crossing an optical path between said opening and said Fresnel lens, wherein said screen is positioned within said optical path for observing the film image and is positioned out of said optical path for projecting the film image onto said image reproducing station.

* * * * *